(12) United States Patent
Olarig (10) Patent No.: US 10,762,032 B2
(45) Date of Patent: *Sep. 1, 2020

(54) ADAPTIVE INTERFACE HIGH AVAILABILITY STORAGE DEVICE

(71) Applicant: Samsung Electronics Co., Ltd., Suwon-si, Gyeonggi-do (KR)

(72) Inventor: Sompong Paul Olarig, Pleasanton, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/565,358

(22) Filed: Sep. 9, 2019

(65) Prior Publication Data

US 2020/0004719 A1 Jan. 2, 2020

Related U.S. Application Data

(63) Continuation of application No. 16/020,938, filed on Jun. 27, 2018, now Pat. No. 10,409,760.

(60) Provisional application No. 62/641,248, filed on Mar. 9, 2018.

(51) Int. Cl.
*G06F 13/10* (2006.01)
*G06F 13/42* (2006.01)
*G06F 13/16* (2006.01)

(52) U.S. Cl.
CPC ...... *G06F 13/4282* (2013.01); *G06F 13/1668* (2013.01); *G06F 2213/0026* (2013.01)

(58) Field of Classification Search
CPC ..................................................... G06F 12/00
See application file for complete search history.

(56) References Cited

U.S. PATENT DOCUMENTS

| 8,514,613 | B1 * | 8/2013 | Lewis | G11C 8/10 365/154 |
|---|---|---|---|---|
| 8,589,723 | B2 | 11/2013 | Kumar et al. | |
| 9,864,662 | B2 | 1/2018 | Arroyo et al. | |
| 10,235,313 | B2 | 3/2019 | Lee et al. | |

(Continued)

FOREIGN PATENT DOCUMENTS

WO  WO 2018/000406 A1  1/2018

*Primary Examiner* — Cheng Yuan Tseng
(74) *Attorney, Agent, or Firm* — Lewis Roca Rothgerber Christie LLP (57) ABSTRACT

An adaptive interface high availability storage device. In some embodiments, the adaptive interface high availability storage device includes: a rear storage interface connector; a rear multiplexer, connected to the rear storage interface connector; an adaptable circuit connected to the rear multiplexer; a front multiplexer, connected to the adaptable circuit; and a front storage interface connector, connected to the front multiplexer. The adaptive interface high availability storage device may be configured to operate in a single-port state or in a dual-port state. The adaptive interface high availability storage device may be configured: in the single-port state, to present a single-port host side storage interface according to a first storage protocol at the rear storage interface connector, and in the dual-port state, to present a dual-port host side storage interface according to the first storage protocol at the rear storage interface connector.

16 Claims, 8 Drawing Sheets

(56) References Cited

U.S. PATENT DOCUMENTS

2017/0212858 A1\* 7/2017 Chu ................ G06F 13/42
2018/0068412 A1   3/2018 Schnell \* cited by examiner

ADAPTIVE INTERFACE HIGH AVAILABILITY STORAGE DEVICE

CROSS-REFERENCE TO RELATED APPLICATIONS

This application is a continuation of U.S. patent application Ser. No. 16/020,938, filed Jun. 27, 2018, which claims priority to and the benefit of U.S. Provisional Application No. 62/641,248, filed Mar. 9, 2018, entitled "METHOD FOR SUPPORTING FPGA+SSD IN END-TO-END DUAL PORT MODE", the entire contents of both of which are incorporated herein by reference.

FIELD

One or more aspects of embodiments according to the present disclosure relate to persistent storage, and more particularly to a storage device having a configurable storage interface, and capable of supporting high availability operation.

BACKGROUND

Persistent storage devices may be used in various applications and may be operated with various interfaces. In some applications, it may be inconvenient to maintain an inventory of storage devices supporting different storage interfaces, in a system in which multiple different interfaces are used. Moreover, some applications may require the capability to operate in a high availability mode.

Thus, there is a need for a high availability storage device capable of operating with different storage interfaces.

SUMMARY

According to an embodiment of the present disclosure there is provided an adaptive interface high availability storage device including: a rear storage interface connector; a rear multiplexer, connected to the rear storage interface connector; an adaptable circuit connected to the rear multiplexer; a front multiplexer, connected to the adaptable circuit: and a front storage interface connector, connected to the front multiplexer, the adaptive interface high availability storage device being configured to operate in a single-port state or in a dual-port state, the adaptive interface high availability storage device being configured: in the single-port state, to present a single-port host side storage interface according to a first storage protocol at the rear storage interface connector, and in the dual-port state, to present a dual-port host side storage interface according to the first storage protocol at the rear storage interface connector.

In one embodiment the adaptable circuit includes a first PCIe root port and a second PCIe root port, the rear multiplexer includes: a rear multiplexer first multiplexer channel having a rear multiplexer first multiplexer channel common port connected to the rear storage interface connector and a rear multiplexer second multiplexer channel having: a rear multiplexer second multiplexer channel common port connected to the rear storage interface connector, a rear multiplexer second multiplexer channel first selectable port connected to the first PCIe root port, and a rear multiplexer second multiplexer channel second selectable port connected to the second PCIe root port.

In one embodiment, the rear multiplexer first multiplexer channel has a rear multiplexer first multiplexer channel first selectable port connected to the first PCIe root port.

In one embodiment, the rear multiplexer first multiplexer channel has a rear multiplexer first multiplexer channel second selectable port, the rear multiplexer first multiplexer channel second selectable port being not connected, in the single-port state, the rear multiplexer first multiplexer channel first selectable port is selected, and in the dual-port state, the rear multiplexer first multiplexer channel first selectable port is selected.

In one embodiment, the first storage protocol is NMVe.

In one embodiment, in the single-port state, the rear multiplexer second multiplexer channel first selectable port is selected; and in the dual-port state, the rear multiplexer second multiplexer channel second selectable port is selected.

In one embodiment, the adaptive interface high availability storage device includes a fixed interface storage device connected to the rear storage interface connector.

In one embodiment, the rear storage interface connector is a U.2 connector.

In one embodiment, the adaptive interface high availability storage device includes a state control input configured to receive a signal for selecting between the single-port state and the dual-port state.

In one embodiment, the rear storage interface connector is a U.2 connector having an E25 pin, and the state control input is the E25 pin.

In one embodiment, the single-port state is a first single-port state; the dual-port state is a first dual-port state; and the adaptive interface high availability storage device is further configured to operate in a second single-port state or in a second dual-port state, the adaptive interface high availability storage device being further configured: in the first single-port state: to present a device side NVMe storage interface at the front storage interface connector; in the first dual-port state: to present a device side NVMe storage interface at the front storage interface connector; in the second single-port state: to present a single-port host side storage interface according to the first storage protocol at the rear storage interface connector, and to present a device side NVMe over fabrics storage interface at the front storage interface connector; and in the second dual-port state: to present a dual-port host side storage interface according to the first storage protocol at the rear storage interface connector, and to present a device side NVMe over fabrics storage interface at the front storage interface connector.

In one embodiment, the adaptable circuit includes a first PCIe endpoint and a second PCIe endpoint, and the front multiplexer includes: a front multiplexer first multiplexer channel having a front multiplexer first multiplexer channel common port connected to the front storage interface connector and a front multiplexer second multiplexer channel having: a front multiplexer second multiplexer channel common port connected to the front storage interface connector, a front multiplexer second multiplexer channel first selectable port connected to the first PCIe endpoint, and a front multiplexer second multiplexer channel second selectable port connected to the second PCIe endpoint.

In one embodiment, the front multiplexer first multiplexer channel has a front multiplexer first multiplexer channel first selectable port connected to the first PCIe endpoint, the front multiplexer first multiplexer channel has a front multiplexer first multiplexer channel second selectable port, the front multiplexer first multiplexer channel second selectable port being not connected, in the first single-port state, in the first dual-port state, in the second single-port state, and in the second dual-port state: the front multiplexer first multiplexer channel first selectable port is selected, and the rear multiplexer first multiplexer channel first selectable port is selected.

In one embodiment, in the first single-port state: the front multiplexer second multiplexer channel first selectable port is selected, and the rear multiplexer second multiplexer channel first selectable port is selected; in the first dual-port state: the front multiplexer second multiplexer channel second selectable port is selected, and the rear multiplexer second multiplexer channel second selectable port is selected; in the second single-port state: the front multiplexer second multiplexer channel second selectable port is selected, and the rear multiplexer second multiplexer channel first selectable port is selected; and in the second dual-port state: the front multiplexer second multiplexer channel second selectable port is selected, and the rear multiplexer second multiplexer channel second selectable port is selected.

In one embodiment, the adaptive interface high availability storage device is further configured, in the second single-port state and in the second dual-port state, to present a PCIe control plane interface at the front storage interface connector.

In one embodiment, the adaptive interface high availability storage device includes: a first bit file memory; a second bit file memory; and a bit file multiplexer, the bit file multiplexer having: a bit file multiplexer common port connected to a configuration port of the adaptable circuit; a bit file multiplexer first selectable port connected to the first bit file memory; and a bit file multiplexer second selectable port connected to the second bit file memory, wherein, in the first single-port state and in the first dual-port state, the bit file multiplexer first selectable port is selected, and in the second single-port state and in the second dual-port state, the bit file multiplexer second selectable port is selected.

In one embodiment, the adaptive interface high availability storage device includes: a first state control input configured to receive a signal for selecting between: a first set of states consisting of the first single-port state and the second single-port state, and a second set of states consisting of the first dual-port state and the second dual-port state; and a second state control input configured to receive a signal for selecting between: the first single-port state and the second dual-port state, when the first state control input selects the first set of states, and the first dual-port state and the second dual-port state, when the first state control input selects the second set of states, wherein: the front storage interface connector is a U.2 connector having an E6 pin, the rear storage interface connector is a U.2 connector having an E25 pin, the first state control input is the E25 pin of the rear storage interface connector, and the second state control input is the E6 pin of the front storage interface connector.

According to an embodiment of the present disclosure there is provided a adaptive interface high availability storage device, including: a rear storage interface connector; and persistent storage, the adaptive interface high availability storage device being configured to operate in a single-port state or in a dual-port state, the adaptive interface high availability storage device being configured: in the single-port state, to present a single-port host side storage interface according to a first storage protocol at the rear storage interface connector, and in the dual-port state, to present a dual-port host side storage interface according to the first storage protocol at the rear storage interface connector.

According to an embodiment of the present disclosure there is provided a storage system, including: a chassis; and an adaptive interface high availability storage device, the adaptive interface high availability storage device including: a rear storage interface connector; a rear multiplexer, connected to the rear storage interface connector; an adaptable circuit connected to the rear multiplexer; a front multiplexer, connected to the adaptable circuit; and a front storage interface connector, connected to the front multiplexer, the adaptive interface high availability storage device being configured to operate in a single-port state or in a dual-port state, the adaptive interface high availability storage device being configured: in the single-port state, to present a single-port host side storage interface according to a first storage protocol at the rear storage interface connector, and in the dual-port state, to present a dual-port host side storage interface according to the first storage protocol at the rear storage interface connector.

In one embodiment, the adaptive interface high availability storage device further includes: a state control input configured to receive a signal for selecting between the single-port state, and the dual-port state, and fixed interface storage device configured to provide the signal for selecting between the single-port state, and the dual-port state.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of an adaptive interface high availability storage device provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1:
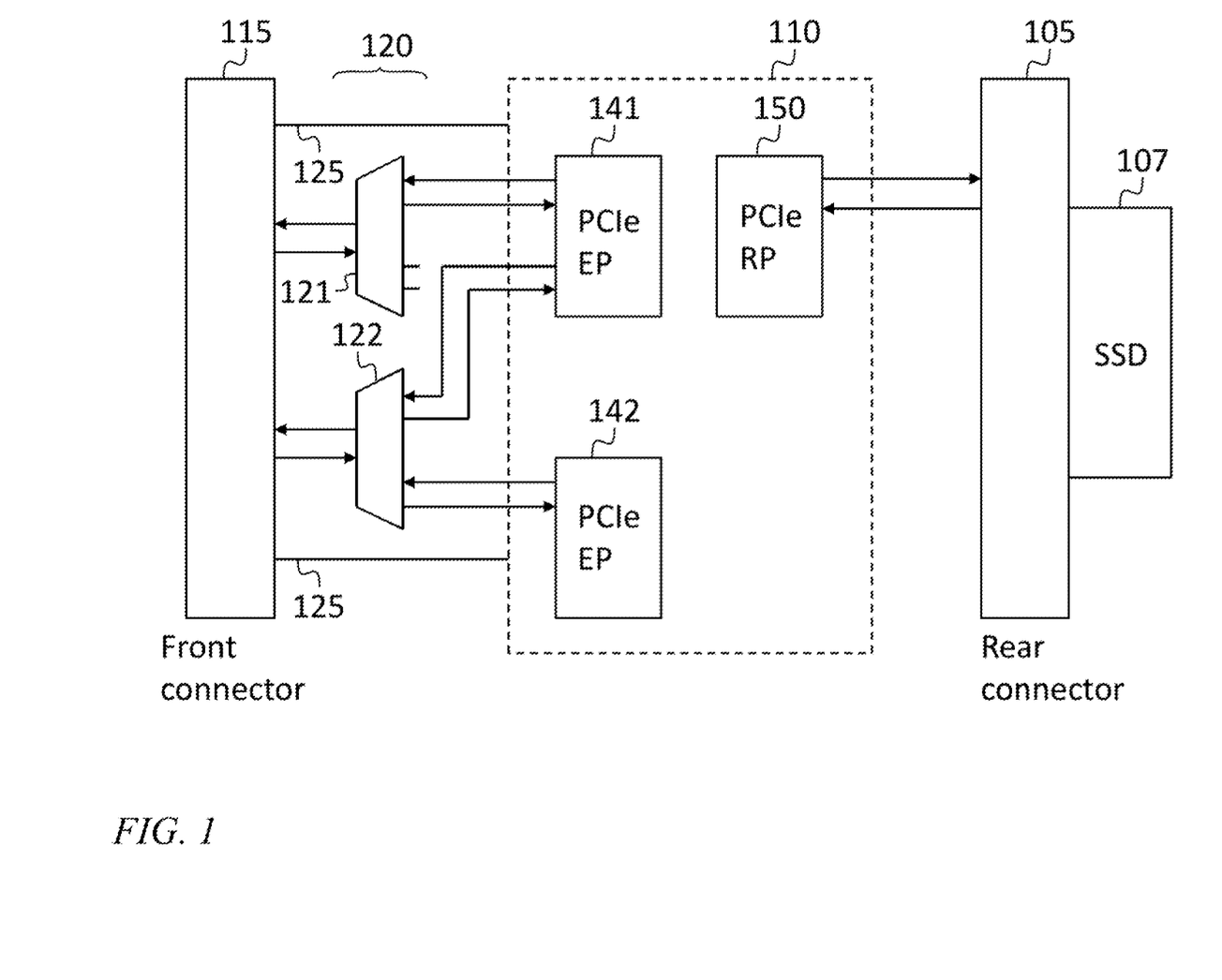
FIG. 1 is a block diagram of an adaptive interface storage device, according to an embodiment of the present disclosure.

Referring to FIG. 1, in some embodiments an adaptive interface storage device includes a rear storage interface connector 105, an adaptable circuit 110, a front storage interface connector 115, and a front multiplexer 120 connected between the front storage interface connector 115 and the adaptable circuit 110. These elements may act as an adapter module that may be connected, through the rear storage interface connector 105, to a fixed interface storage device (such as a nonvolatile memory express (NVMe) solid state drive (SSD)) 107, and behave, to a host chassis, as a storage device capable of supporting more than one storage interface. The front multiplexer may be an example of a routing or switching circuit, which in general may be any suitable circuit for routing signals to one of several available paths. If more than two paths are available, then a routing element such as PCIe switch may be used. Routing may be, in one example, between only two elements.

In some embodiments, the adaptive interface storage device may conform to (i) a 3.5 inch hard drive form-factor (or "large form factor" (LFF)) standard, or (ii) a 2.5 inch hard drive form-factor (or small form factor (SFF)) standard, or (iii) a standard PCIe card form factor, e.g., a full-height, full-length (FH-FL) card outline, or a full-height, half length (FH-HL) outline.

As used herein, a "storage interface" is an interlace between (i) a storage device (e.g., a persistent storage device such as a hard drive or a solid state drive), and (ii) a host, such as a motherboard or processer connected to the storage device. In some embodiments the host is a chassis which provides power and mechanical support (e.g., mounting and cooling) to the storage device, and which is connected to the storage device and provides connections between another host (e.g., a server) and the storage device. In a connection, at a storage interface, between a persistent storage device and a host, the host may present a "host side storage interface" e.g., a host side NVMe storage interface, to the storage device (e.g., the host may send commands (e.g., read or write command), through an NVMe interface, to the storage device) and the storage device may present a "device side storage interface" e.g., a device side NVMe storage interface, to the host. As another example, the storage interface may be NVMe over Fabrics.

The adaptable circuit 110 may be a programmable logic circuit such as a field programmable gate array (FPGA). The embodiment of FIG. 1 may further include one or more sets of conductors, forming one or more connections (which may be referred to as "Ethernet connections") 125 between the adaptable circuit 110 and the front storage interface connector 115, and the adaptable circuit 110 may, in some modes of operation (or "states"), be configured to present one or more Ethernet interfaces (e.g., two Ethernet interfaces, as shown) at the Ethernet connections 125. The front storage interface connector 115 may be a U.2 connector, and the SAS port0 and SAS port1 pins of the U.2 connector may be used for the Ethernet connections.

The adaptive interface storage device of FIG. 1 may be configured to operate in one of two states, a first state and a second state; in the first state, the adaptive interface storage device may be configured to present a device side storage interface according to a first storage protocol (e.g., NVMe) at the from storage interface connector, and in the second state, the adaptive interface storage device may be configured to present a device side storage interface according to a second storage protocol, (e.g., NVMe over Fabrics), at the front storage interface connector 115.

The front multiplexer 120 may be configured differently in the first state and in the second state, to support the two different device side storage interfaces. The front multiplexer 120 may include a first multiplexer channel 121 and a second multiplexer channel 122 as shown in FIG. 1. Each of the first multiplexer channel 121 and the second multiplexer channel 122 may be controlled as discussed in further detail below. In some embodiments, the front multiplexer 120 is implemented as a single integrated circuit, e.g., a quad 1:2-2:1 multiplexer, linear redriver with signal conditioning. such as a model SN65LVCP114 integrated circuit available from Texas Instruments.

As used herein, a multiplexer is a device with a single common port, two or more selectable ports, and a port select input. In operation, depending on a select signal received at the select input, the multiplexer connects (i.e., makes an internal connection between) the common port and one port (which may be referred to as the "selected port") of the selectable ports. Each port may be one lane wide or several lanes wide. All of the lanes of a port may be input lanes or output lanes, or a port may include a combination of input lanes and output lanes. A multiplexer with a common input port (having no output lanes) and a plurality of selectable output lanes may also be referred to as a de-multiplexer. A multiplexer with a common port that is several lanes wide may be equivalent to a plurality of multiplexers (which may be referred to as "multiplexer channels"), each multiplexer channel having fewer lanes (such that the total number of lanes of the multiplexer channels equals the number of lanes of the multiplexer to which they are, together, equivalent), and having a shared select input connection (i.e., each having its select input connected to the same select signal source). In some embodiments, a plurality of multiplexer channels may be included in a single integrated circuit (such as the model SN65LVCP114 integrated circuit available from Texas instruments). Such an integrated circuit may, for example, include four independent channels (each one being one lane wide) and each having a separate, independent select input, so that the integrated circuit may have four select inputs.

As such, if a quad 1:2-2:1 multiplexer, linear redriver with signal conditioning, such as the model SN65LVCP114 available from Texas Instruments, is employed, it may be referred to as a single multiplexer (e.g., the front multiplexer 120), or as two multiplexer channels (the first multiplexer channel 121 and the second multiplexer channel 122), or as eight multiplexer channels, each one lane wide (together providing four input lanes and four output lanes).

The adaptable circuit 110 may include a first peripheral component interconnect express (PCIe) endpoint 141 and a second PCIe endpoint 142, which may form part of the implementation of the device side storage interface, or of a control plane interface, at the front storage interface connector 115, as discussed in further detail below. It may also include one or more PCIe root ports (or root complexes) 150 for implementing a host side storage interface, at the rear storage interface connector 105, to a fixed interface storage device 107 that may be connected to the rear storage interface connector 105.

Figure 2A:
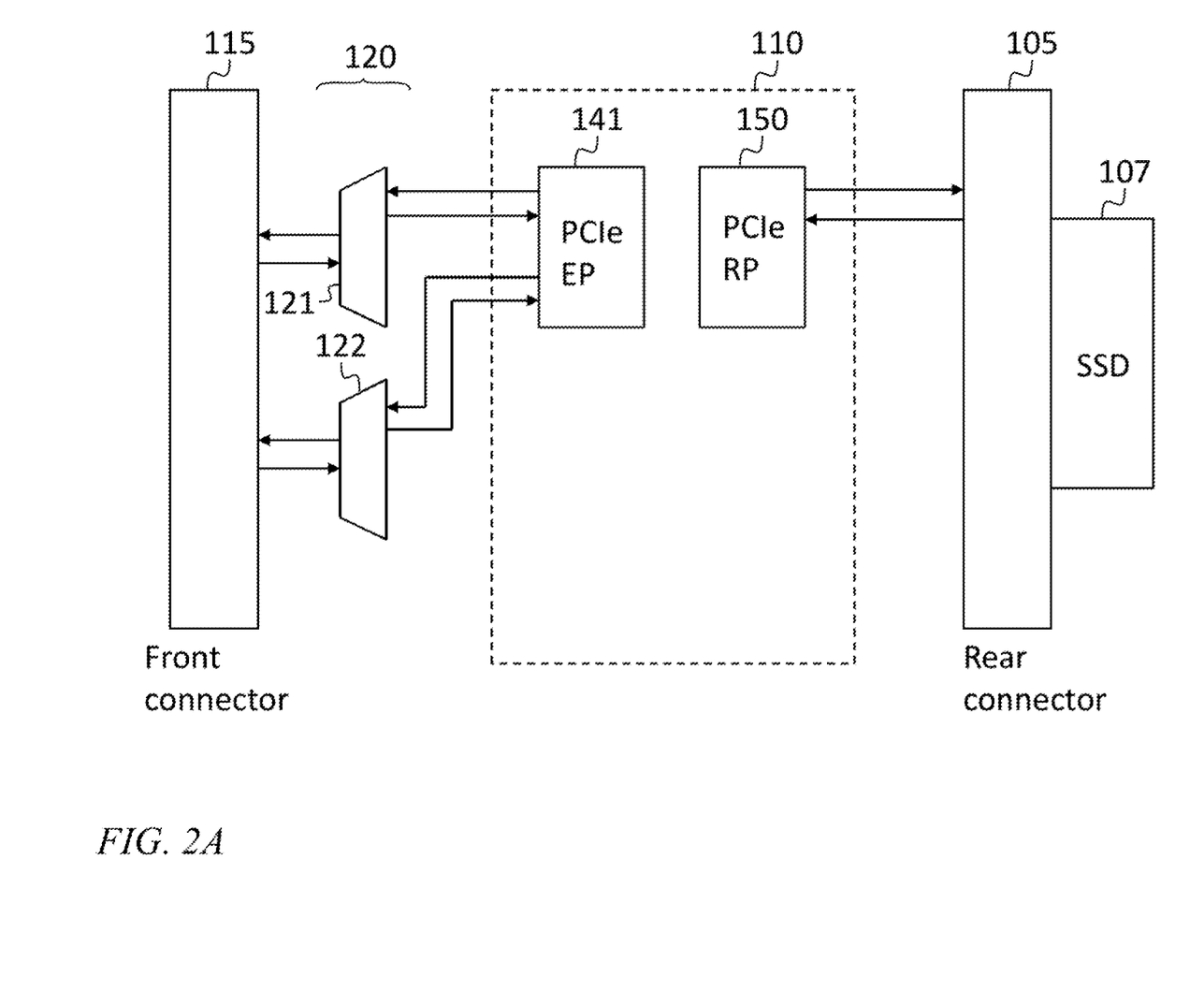
FIG. 2A is a block diagram of an adaptive interface storage device, according to an embodiment of the present disclosure.

Referring to FIG. 2A, in some embodiments, when the adaptive interface storage device is operating in the first state, the first selectable port of the first multiplexer channel is selected and the first selectable port of the second multiplexer channel is selected. In FIG. 2A this configuration is illustrated, for ease of comprehension, by omitting from the drawing the lines terminating at the second selectable port of the first multiplexer channel and at the second selectable port of the second multiplexer channel, even though the conductors making those connections in other circumstances (e.g., when the adaptive interface storage device is operating in the second state) may be present. The second PCIe endpoint 142 may be absent (as a result of the programming of the adaptable circuit 110 (as discussed in further detail below)) or it may be present but unused (as a result of the second selectable port of the second multiplexer channel not being selected). Similarly, the Ethernet connections 125 may not be operable when the adaptive interface storage device is operating in the first state (as a result of the programming of the adaptable circuit. 110); this is illustrated, for ease of comprehension, by omitting from FIG. 2A the lines representing (e.g., in FIG. 1), the Ethernet connections 125, even though the conductors employed by these connections (e.g., when the adaptive interface storage device is operating in the second state) may be present.

In the first state, the device side storage interface presented at the front storage interface connector 115 may be NVMe. The adaptive interface storage device may receive NVMe commands from a host (e.g., a host connected to a chassis housing the adaptive interface storage device, as discussed in further detail below), and the commands may be forwarded to the fixed interface storage device 107 through the front multiplexer 120, the adaptable circuit 110, and the rear storage interface connector 105. The fixed interface storage device 107 may process each command, and send, in response to each received command, through the rear storage interface connector 105, a command response, which the adaptive interface storage device may forward back to the host through the adaptable circuit 110, the front multiplexer 120, and the front storage interface connector 115. The adaptive interface storage device may present a 1×4 NVMe device side storage interface to the host. The first PCIe endpoint 141 may be a 1×4 PCIe endpoint; two of the four lanes of the 1×4 NVMe device side storage interface (e.g., the first two lanes, lanes 0 and 1) may be connected to the first PCIe endpoint 141 through the first multiplexer channel 121, and the other two of the four lanes of the 1×4 NVMe device side storage interface (e.g., the third and fourth lanes, lanes 2 and 3) may be connected to the first PCIe endpoint 141 through the second multiplexer channel 122.

Figure 2B:
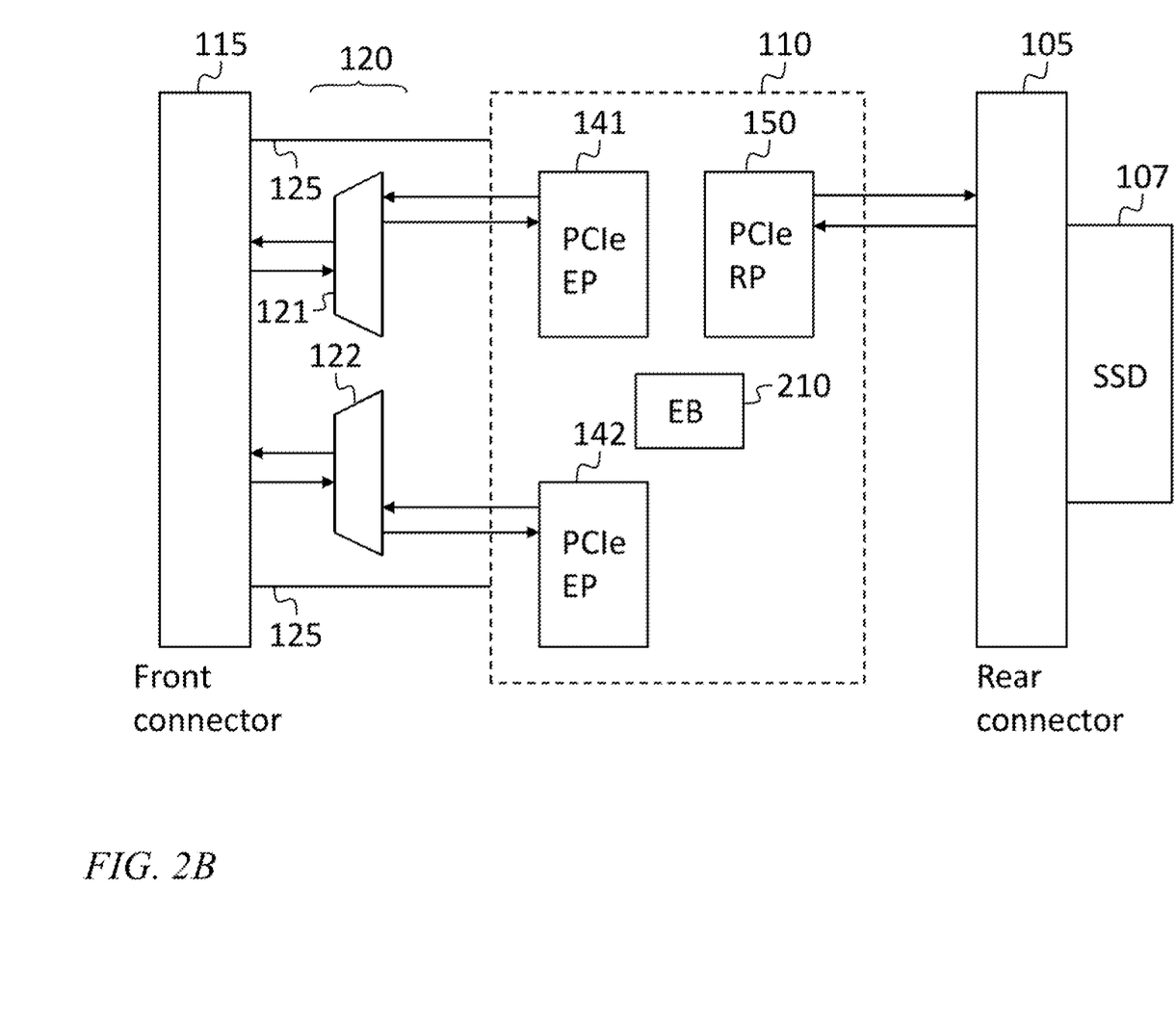
FIG. 2B is a block diagram of an adaptive interface storage device, according to an embodiment of the present disclosure.

Referring to FIG. 2B, in some embodiments, when the adaptive interface storage device is operating in the second state, the first selectable port of the first multiplexer channel is selected and the second selectable port of the second multiplexer channel is selected. In FIG. 2B this configuration is illustrated, or ease of comprehension, by omitting from the drawing the lines terminating at the second selectable port of the first multiplexer channel and at the first selectable port of the second multiplexer channel, even though the conductors making those connections in other circumstances (e.g., when the adaptive interface storage device is operating in the first state) may be present.

In the second state, the device side storage interface presented at the front storage interface connector 115 may be NVMe over Fabrics, over the one or more Ethernet connections 125. The adaptive interface storage device may receive NVMe over Fabrics commands through the Ethernet connections 125, and the commands may be forwarded to the fixed interface storage device 107 through the adaptable circuit 110 and the rear storage interface connector 105. The adaptable circuit 110 may include an Ethernet-NVMe bridge 210 for translating between the NVMe over Fabrics storage protocol employed at the front storage interface connector 115 and the NVMe storage protocol employed at the rear storage interface connector 105.

As is the case when the adaptive interface storage device is operating in the first state, when the adaptive interface storage device is operating in the second state, the fixed interface storage device 107 may process each command it receives, and send, for each received command, through the rear storage interface connector 105, a command response, which the adaptive interface storage device may forward back to the host through the adaptable circuit 110 and the front storage interface connector 115. The adaptive interface storage device may present an NVMe over Fabrics device side storage interface to the host.

When the adaptive interface storage device is operating in the second state, the first PCIe endpoint 141 may be a 1×4 PCIe endpoint and the second PCIe endpoint 142 may also be a 1×4 PCIe endpoint; together the first PCIe endpoint 141 and the second PCIe endpoint 142 may present, at the front storage interface connector 115, through the first multiplexer channel 121 and the second multiplexer channel 122, two ×2 (two by two) PCIe links for control plane operations. Such control plane operations may include, for example, updating erasure codes in the fixed interface storage device 107, or upgrading firmware in the adaptive interface storage device.

As may be seen from FIGS. 2A and 2B, the state of the first multiplexer channel 121 may be the same in the first state of the adaptive interface storage device and in the second state of the adaptive interface storage device (and the second selectable port of the first multiplexer channel 121 may be "not connected", i.e., not connected to any other element); it may be included in the system to provide delay equalization with PCIe lanes connected through the second multiplexer channel 122. Both when the adaptive interface storage device is operating in the first state and when the adaptive interface storage device is operating in the second state, the adaptive interface storage device may present a host side 1×4 NVMe storage interface to the fixed interface storage device 107, which, in turn, may present a device side 1×4 NVMe storage interlace to the adaptive interface storage device.

Figure 3A:
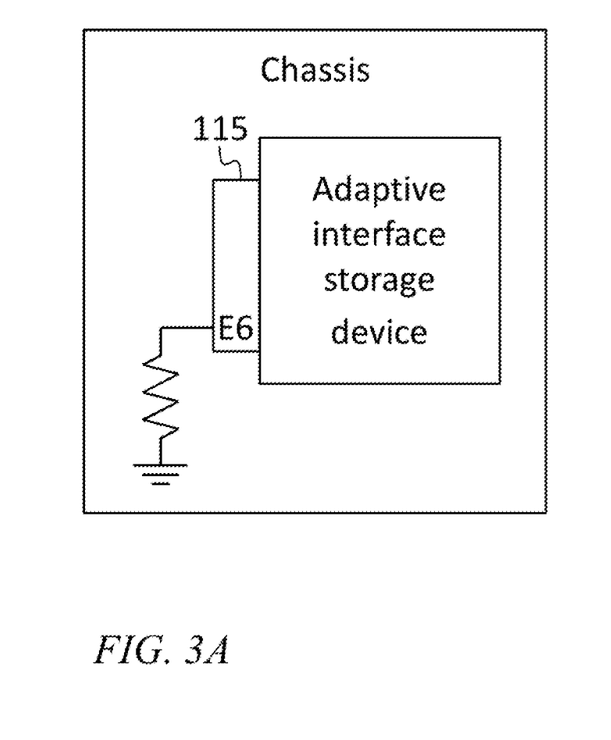
FIG. 3A is a block diagram of a chassis with an adaptive interface storage device, according to an embodiment of the present. disclosure.
Figure 3B:
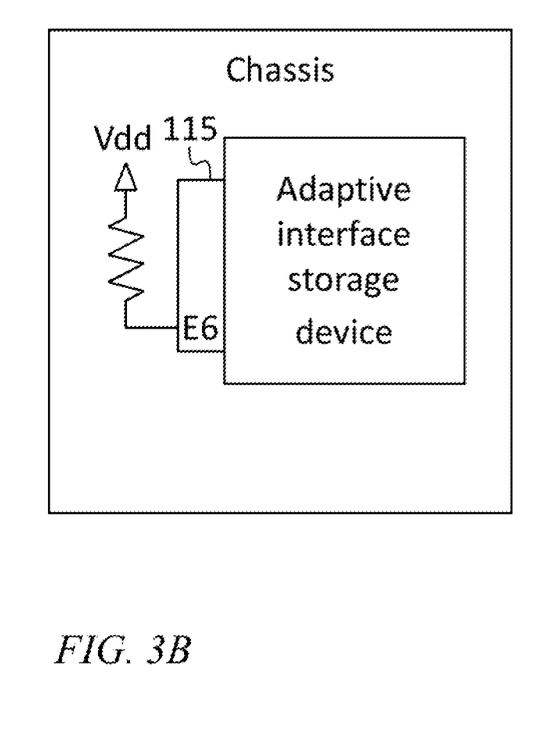
FIG. 3B is a block diagram of a chassis with an adaptive interface storage device, according to an embodiment of the present disclosure.

Referring to FIGS. 3A and 3B, in some embodiments the adaptive interface storage device is installed in a chassis, as mentioned above. The adaptive interface storage device may have a pin (e.g., the E6 pin of the U.2 connector, if the front storage interface connector 115 is a U.2 connector), through which the adaptive interface storage device receives a signal for selecting between the first state and the second state. The chassis may have wiring connecting this pin to ground (as in FIG. 3A) to signal to the adaptive interface storage device that it is to operate in the first state, or to Vdd (as in FIG. 3B) to signal to the adaptive interface storage device that it is to operate in the second state. Circuitry in the adaptive interface storage device may cause the adaptive interface storage device to operate in the state identified by the signal (e.g., the signal received at the E6 pin), by setting the front multiplexer 120 accordingly, and programming the adaptable circuit 110 accordingly, as discussed in further detail below.

Figure 4:
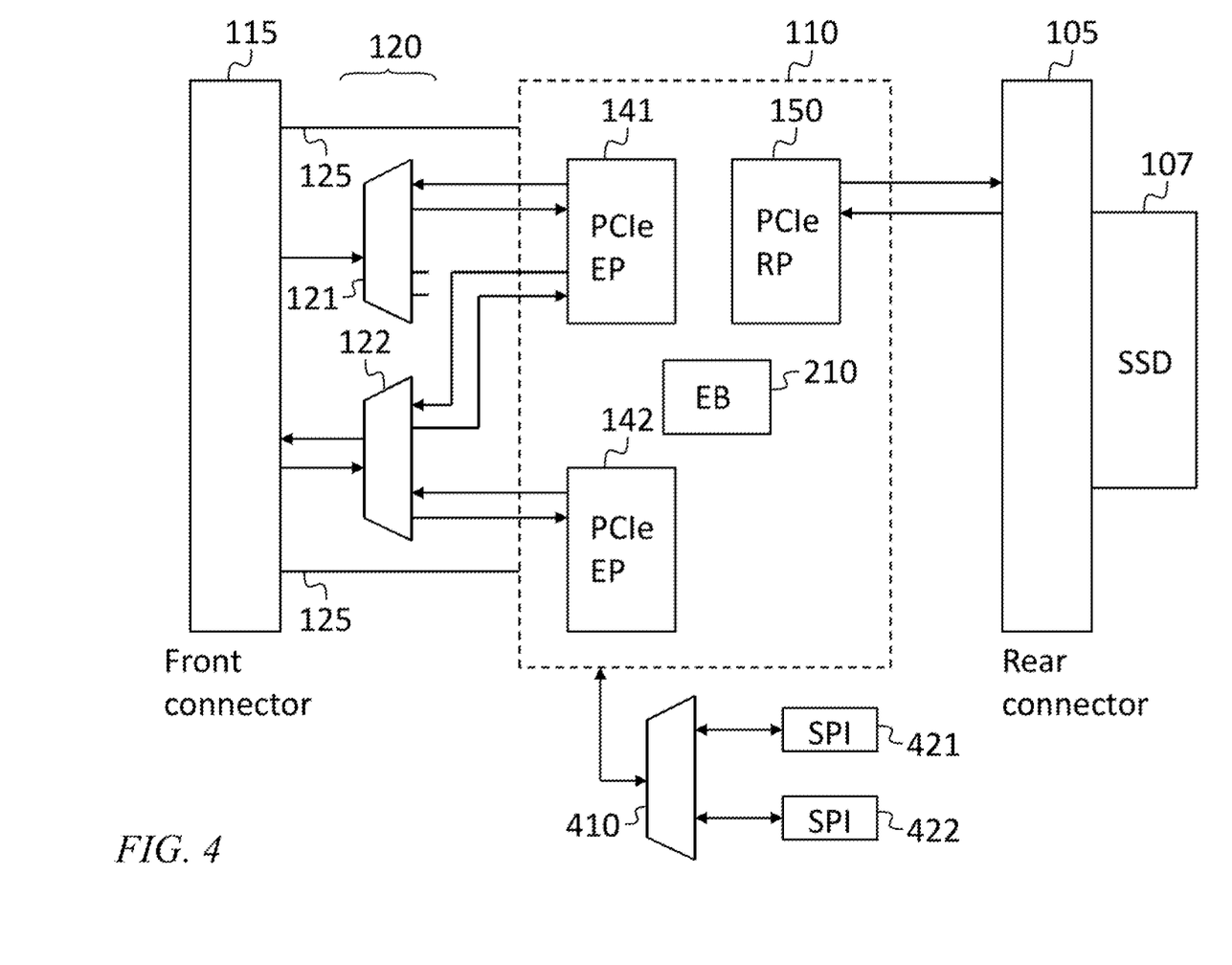
FIG. 4 is a block diagram of an adaptive interface storage device, according to an embodiment of the present disclosure.

Referring to FIG. 4, in some embodiments, the bit files loaded by the adaptable circuit 110 at startup (through a configuration port (e.g., a serial peripheral interlace (SPI) configuration port) of the adaptable circuit 110) is selected based on the state in which the adaptive interface storage device is operating. For example, when the adaptive interface storage device is operating in the first state, a bit file multiplexer 410 may connect the configuration port of the adaptable circuit 110 to a first memory 421 (e.g., an SPI flash memory) storing bit files for configuring the adaptable circuit 110 to operate in the first state, and in the second state, the bit file multiplexer 410 may connect the configuration port of the adaptable circuit 110 to a second memory 422 (e.g., an SPI flash memory), storing bit files for configuring the adaptable circuit 110 to operate in the second state. As such, memory 421 may store only bit files for the first state, and memory 422 may store only bit files for the second state. One of the bit files in each of the first memory 421 and the second memory 422 may include a PCIe portion, that may be read into the adaptable circuit 110 and implemented first, causing the PCIe endpoints 141, 142 and root port 150 to be configured in time to participate in PCIe training. The remainder of the adaptable circuit 110 may then be configured while PCIe link training takes place or after PCIe link training is complete successfully, or both during and after PCIe link training.

Using an external hardware front multiplexer 120 (instead. of programming the connections made by the front multiplexer 120 into the adaptable circuit 110) may avoid the problems that otherwise might occur if the configuring of the adaptable circuit 110 takes longer than the time allocated by the PCIe standard for training of the PCIe links.

Figure 5:
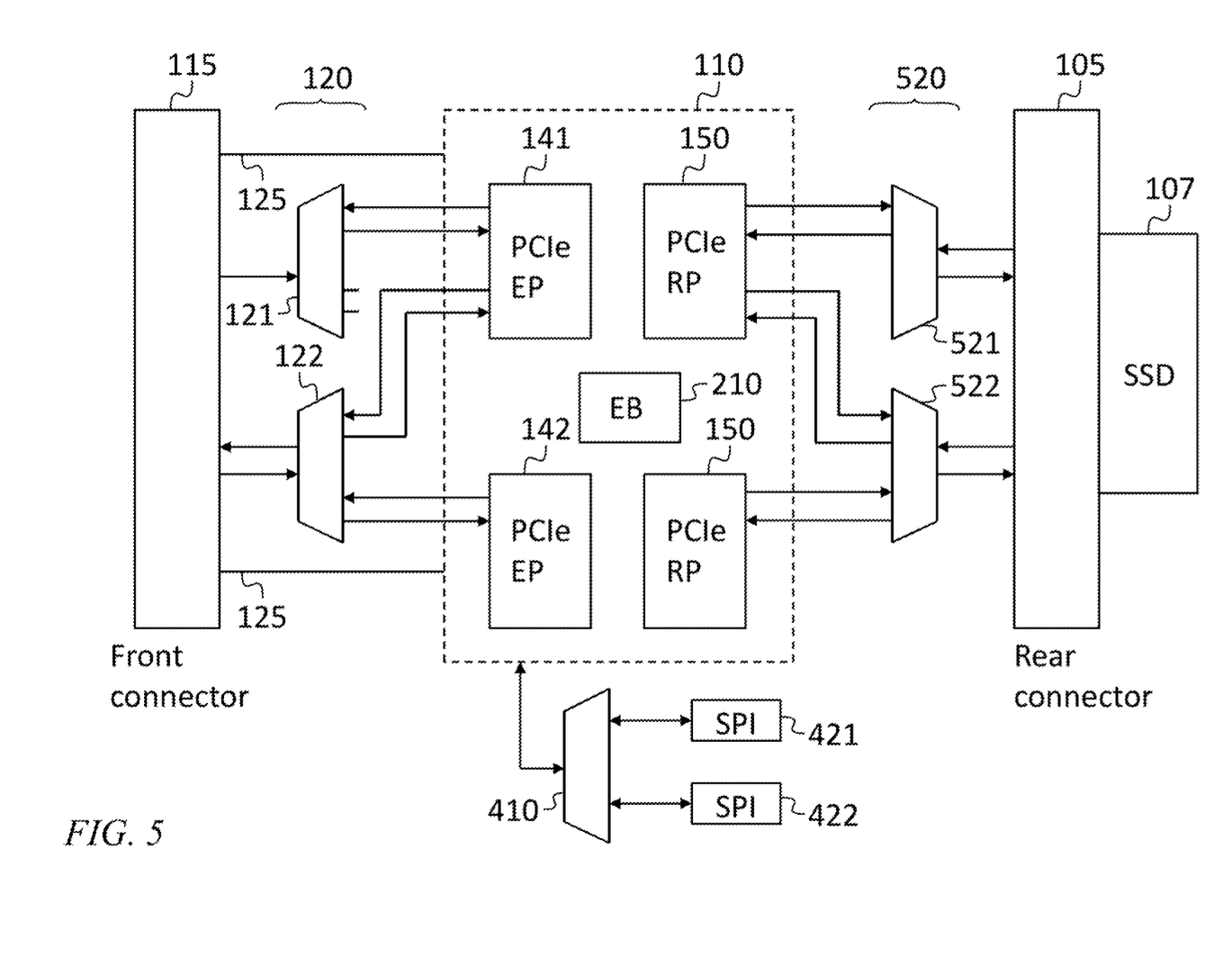
FIG. 5 is a block diagram of an adaptive interface high availability storage device, according to an embodiment of the present disclosure.

Referring to FIG. 5, in some embodiments of an adaptive interface high availability storage device, the adaptable circuit 110 includes two PCIe root ports 150, which are connected to the fixed interface storage device 107 through a rear multiplexer 520. The rear multiplexer 520 includes a first multiplexer channel 521 and a second multiplexer channel 522. In some embodiments, the fixed interface storage device 107 is a high availability persistent storage device, i.e., a persistent storage device presenting two separate device side device side storage interfaces, so that if it is connected to two hosts (each of the two hosts begin connected to a respective one of the device side device side storage interfaces), the failure of one host will not result in an inability to access the data stored in the persistent storage device, as the data stored in the persistent storage device will remain accessible through the other host.

As discussed in further detail below, the embodiment of FIG. 5 may enable an adaptive interface high availability storage device to use a fixed interface storage device 107 that supports dual-port operation, and, when such a fixed interface storage device 107 is connected to the rear storage interface connector 105, to support dual-port operation at the front storage interface connector 115.

Figure 6A:
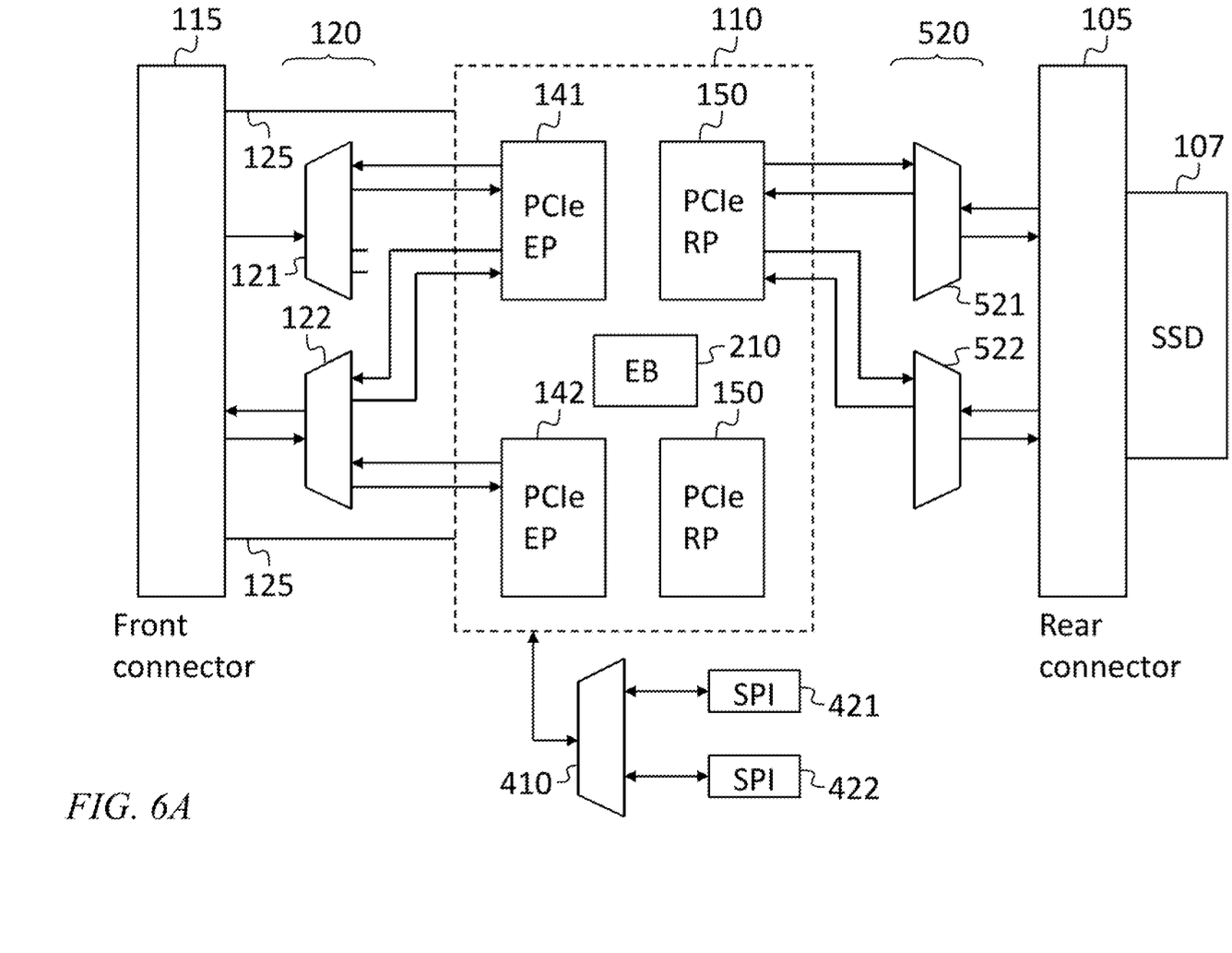
FIG. 6A is a block diagram of an adaptive interface high availability storage device, according to an embodiment of the present disclosure.

FIG. 6A shows the embodiment of FIG. 5 configured to operate in a single-port mode. In this mode, the first selectable port of the first multiplexer channel 521 is selected and the first selectable port of the second multiplexer channel 522 is selected, and the adaptive interface high availability storage device may operate in the same manner as the adaptive interface storage device of FIG. 1. with the connection to the fixed interface storage device 107 being made through the rear multiplexer 520. If the rear storage interface (to the fixed interface storage device 107) is 1×4 NVMe, then two lanes of the NVMe connection (i.e., of the PCIe connection) may be carried by the first multiplexer channel 521, and the other two lanes of the PCIe connection may be carried by the second multiplexer channel 522. The first state and the second state of the embodiment of FIG. 1 may therefore be referred to as a "first single-port state" and a "second single-port state", respectively, for an adaptive interface high availability storage device (i.e., for an adaptive interface storage device with the capability to support high availability operation).

Figure 6B:
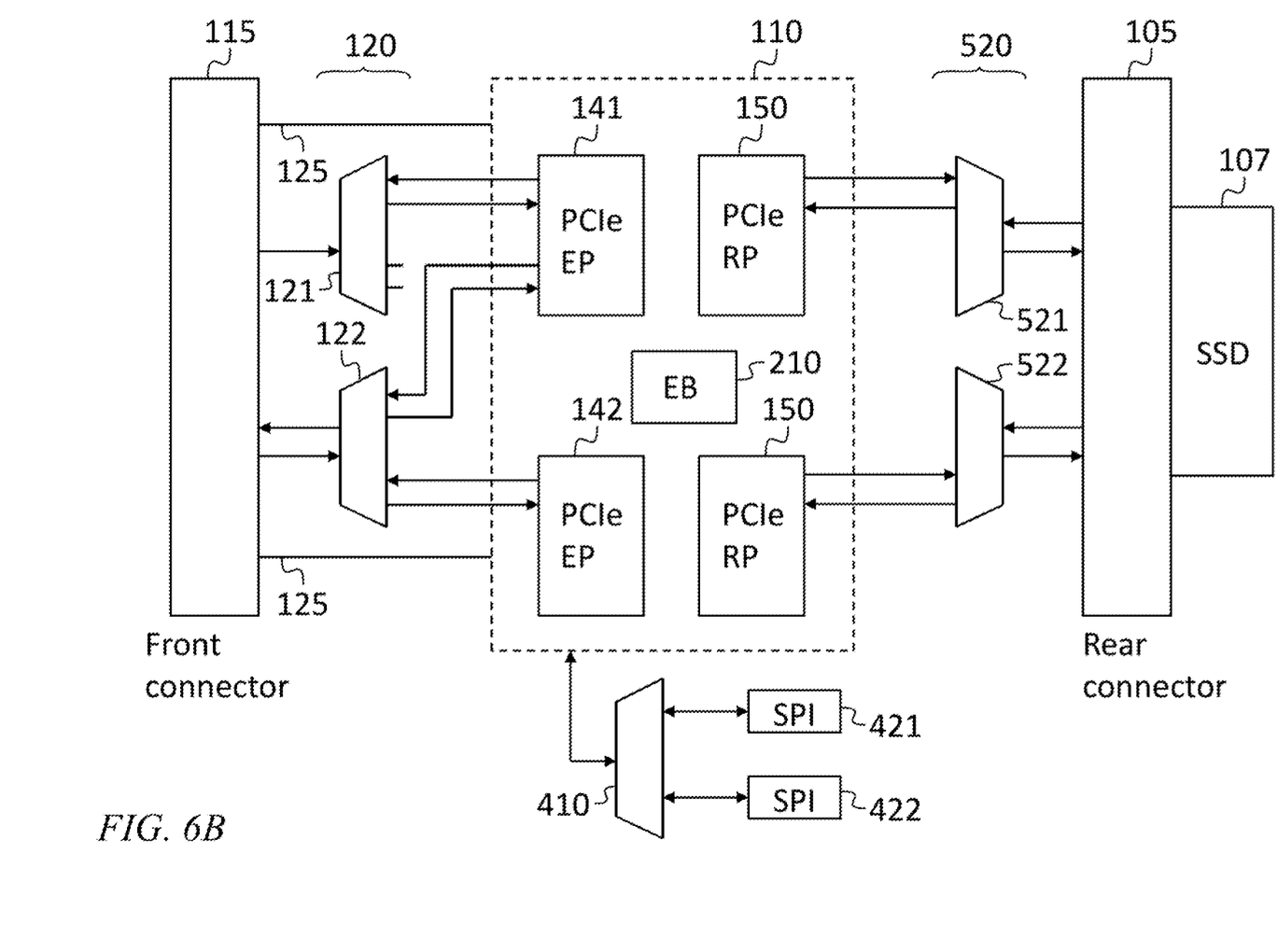
FIG. 6B is a block diagram of an adaptive interface high availability storage device, according to an embodiment of the present disclosure.

FIG. 6B shows the embodiment of FIG. 5 configured to operate in a dual-port mode. In this mode the first selectable port of the first multiplexer channel 521 is selected and the second selectable port of the second multiplexer channel 522 is selected. In this mode, when the device side storage interface is NVMe over Fabrics (i.e., in a "second dual-port state"), the adaptive interface high availability storage device provides two Ethernet connections 125 (as shows in, e.g., FIG. 6B), in a dual-port mode, at the front storage interface connector 115. Each command received through either of the two Ethernet connections 125 is forwarded, through the adaptable circuit 110, to a respective one of the multiplexer channels 521, 522, to a respective port of the dual-port fixed interface storage device 107, and each command completion sent by a port of the dual-port fixed interface storage device 107 is forwarded through a respective one of the multiplexer channels 521, 522, through the adaptable circuit 110, and through a respective one the two Ethernet connections 125 to a respective host (connected (e.g., through a chassis) to one of the two Ethernet connections 125).

In dual-port mode, when the device side storage interface is NVMe (i.e., in the first dual-port state), the first selectable port of the first multiplexer channel 121 of the front multiplexer 120 is selected, and the second selectable port of the second multiplexer channel 122 of the front multiplexer 120 is selected (as is the case in the second single-port state, and in the second dual-port state). The adaptive interface high availability storage device then provides dual port NVMe at the front storage interface connector 115, through two NVMe ports each being provided by a respective one of the PCIe endpoints 141, in a manner analogous to that described above for a storage interface, at the front storage interface connector 115, that is dual-port NVMe over Fabrics.

If the rear storage interface connector 105 is a U.2 connector, then the select input of the rear multiplexer 520 may be controlled by the E25 pin of the rear storage interface connector 105. The fixed interface storage device 107 may be configured to pull the E25 pin low if the fixed interface storage device 107 supports dual-port operation, and when the E25 pin is low, the adaptive interface high availability storage device may configure the rear multiplexer 520 accordingly. As is the case for the front multiplexer 120, the first multiplexer channel 521 of the rear multiplexer 520 may have a second selectable port that is not connected, and the first multiplexer channel 521 of the rear multiplexer 520 may provide delay equalization with PCIe lanes connected through the second multiplexer channel 522. Each port of the dual-port fixed interface storage device 107 may be a 1×2 PCIe port, and the rear multiplexer 520 may be a model SN65LVCP114 integrated circuit available from Texas Instruments. In some embodiments the rear multiplexer 520 is instead implemented as two model SN65LVCP114 integrated circuits, each of the multiplexer channels 521, 522 is configured to carry 4 PCIe lanes, and the adaptive interface high availability storage device is capable of accommodating a dual-port fixed interface storage device 107 in which each port is a 1×4 PCIe port. In such an embodiment one of the root ports 150 (the upper root port of FIG. 5) may be a 1×8 root port to provide a sufficient number of lanes when a 1×8 single-poll fixed interface storage device 107 is connected to the rear storage interface connector 105. In some embodiments, a front storage interface connector 115 suitable for carrying 8 lanes of PCIe (e.g., an X8 PCIe connector or an SFF-TA connector) is used; in this case the front multiplexer 120 may also be implemented as two model SN65LVCP114 integrated circuits.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of an adaptive interface high availability storage device have been specifically described and illustrated herein, many modifications and variations will be apparent to those skilled in the art. Accordingly, it is to be understood that an adaptive interface high availability storage device constructed according to principles of this disclosure may be embodied other than as specifically described herein. The invention is also defined in the following claims, and equivalents thereof.

What is claimed is:

1. A device comprising:
   a first storage interface;
   a first remapping logic, connected to the first storage interface;
   an adaptable circuit connected to the first remapping logic;
   a second remapping logic, connected to the adaptable circuit; and
   a second storage interface, connected to the second remapping logic,
   the device being configured to operate in a single-port state or in a dual-port state,
   the device being configured:
      in the single-port state, to present a single-port host side storage interface according to a storage protocol at the first storage interface, and
      in the dual-port state, to present a dual-port host side storage interface according to the storage protocol at the first storage interface,
   wherein the first remapping logic comprises:
      a first channel having a common port connected to the first storage interface and
      a second channel having:
         a common port connected to the first storage interface,
         a first selectable port connected to a first port of the adaptable circuit, and
         a second selectable port connected to a second port of the adaptable circuit,
   wherein:
      the first port of the adaptable circuit is a first root port,
      the second port of the adaptable circuit is a second root port, and
      the first root port and the second root port are based on a protocol.

2. The device of claim 1, wherein the first channel of the first remapping logic has a first selectable port connected to the first root port.

3. The device of claim 2, wherein:
the first channel of the first remapping logic has a second selectable port, the second selectable port being not connected,
in the single-port state, the first selectable port of the first channel of the first remapping logic is selected, and
in the dual-port state, the second selectable port of the first channel of the first remapping logic is selected.

4. The device of claim 1, wherein the storage protocol is Non-volatile Memory Express (NMVe).

5. The device of claim 1, wherein:
in the single-port state, the first selectable port of the second channel of the first remapping logic is selected; and
in the dual-port state, the second selectable port of the second channel of the first remapping logic is selected.

6. The device of claim 1, further comprising a fixed interface storage device connected to the first storage interface.

7. The device of claim 1, wherein the first storage interface comprises a U.2 connector.

8. The device of claim 1, further comprising a state control input configured to receive a signal for selecting between the single-port state and the dual-port state.

9. The device of claim 8, wherein the first storage interface comprises a U.2 connector having an E25 pin, and the state control input is the E25 pin.

10. The device of claim 1, wherein:
the single-port state is a first single-port state;
the dual-port state is a first dual-port state; and
the device is further configured to operate in a second single-port state or in a second dual-port state,
the device being further configured:
in the first single-port state:
to present a device side Non-volatile Memory Express (NVMe) storage interface at the second storage interface;
in the first dual-port state:
to present a device side NVMe storage interface at the second storage interface;
in the second single-port state:
to present a single-port host side storage interface according to the storage protocol at the first storage interface, and
to present a device side NVMe over fabrics storage interface at the second storage interface; and
in the second dual-port state:
to present a dual-port host side storage interface according to the storage protocol at the first storage interface, and
to present a device side NVMe over fabrics storage interface at the second storage interface.

11. The device of claim 10, wherein:
the adaptable circuit comprises a first PCIe endpoint and a second PCIe endpoint, and
the second remapping logic comprises:
a first channel having a common port connected to the second storage interface and
a second channel having:
a common port connected to the second storage interface,
a first selectable port connected to the first PCIe endpoint, and
a second selectable port connected to the second PCIe endpoint.

12. The device of claim 11, wherein:
the first channel of the second remapping logic has a first selectable port connected to the first PCIe endpoint,
the first channel of the second remapping logic has a second selectable port, the second selectable port being not connected,
in the first single-port state, in the first dual-port state, in the second single-port state, and in the second dual-port state:
the first selectable port of the first channel of the second remapping logic is selected, and
the first selectable port of the first channel of the first remapping logic is selected is selected.

13. The device of claim 11, wherein:
in the first single-port state:
the first selectable port of the second channel of the second remapping logic is selected, and
the first selectable port of the second channel of the of the first remapping logic is selected;
in the first dual-port state:
the second selectable port of the second channel of the second remapping logic is selected, and
the second selectable port of the second channel of the first remapping logic is selected;
in the second single-port state:
the second selectable port of the second channel of the second remapping logic is selected, and
the first selectable port of the second channel of the first remapping logic is selected; and
in the second dual-port state:
the second selectable port of the second channel of the second remapping logic is selected, and
the second selectable port of the second channel of the first remapping logic is selected.

14. The device of claim 13, wherein the device is further configured, in the second single-port state and in the second dual-port state, to present a PCIe control plane interface at the second storage interface.

15. The device of claim 10, further comprising:
a first bitfile memory;
a second bitfile memory; and
a bitfile multiplexer,
the bitfile multiplexer having:
a common port connected to a configuration port of the adaptable circuit;
a first selectable port connected to the first bitfile memory; and
a second selectable port connected to the second bitfile memory,
wherein,
in the first single-port state and in the first dual-port state, the first selectable port of the bitfile multiplexer is selected, and
in the second single-port state and in the second dual-port state, the second selectable port of the bitfile multiplexer is selected.

16. The device of claim 10, further comprising:
a first state control input configured to receive a signal for selecting between:
a first set of states consisting of the first single-port state and the second single-port state, and
a second set of states consisting of the first dual-port state and the second dual-port state; and
a second state control input configured to receive a signal for selecting between:
the first single-port state and the second dual-port state, when the first state control input selects the first set of states, and the first dual-port state and the second dual-port state, when the first state control input selects the second set of states, wherein:
the second storage interface comprises a U.2 connector having an E6 pin,
the first storage interface comprises a U.2 connector having an E25 pin,
the first state control input is the E25 pin of the first storage interface, and
the second state control input is the E6 pin of the U.2 connector of the second storage interface.

\* \* \* \* \*